(12) United States Patent
Bassi et al.

(10) Patent No.: US 7,359,575 B2
(45) Date of Patent: Apr. 15, 2008

(54) DYNAMIC WARP MAP GENERATION SYSTEM AND METHOD

(75) Inventors: Zorawar S. Bassi, Markham (CA); Louie Lee, Richmond Hill (CA); Gregory Lionel Smith, Toronto (CA)

(73) Assignee: Silicon Optix Inc., San Jose, CA (US)

( * ) Notice: Subject to any disclaimer, the term of this patent is extended or adjusted under 35 U.S.C. 154(b) by 661 days.

(21) Appl. No.: 11/007,710

(22) Filed: Dec. 7, 2004

(65) Prior Publication Data

US 2006/0120620 A1   Jun. 8, 2006

(51) Int. Cl.
*G06K 9/36* (2006.01)
*G06T 5/10* (2006.01)

(52) U.S. Cl. ...................... 382/276; 345/427
(58) Field of Classification Search ............... 382/276; 345/427
See application file for complete search history.

(56) References Cited

U.S. PATENT DOCUMENTS

| | | | |
|---|---|---|---|
| 4,472,732 A | | 9/1984 | Bennett et al. |
| 4,835,532 A | | 5/1989 | Fant |
| 4,975,976 A | | 12/1990 | Kimata et al. |
| 5,175,808 A | | 12/1992 | Sayre |
| 5,204,944 A | * | 4/1993 | Wolberg et al. ............. 345/427 |
| 5,793,340 A | * | 8/1998 | Morita et al. ................ 345/7 |
| 5,795,046 A | * | 8/1998 | Woo ............................ 353/69 |
| 5,808,623 A | | 9/1998 | Hamburg |
| 6,097,855 A | | 8/2000 | Levien |
| 6,222,593 B1 | * | 4/2001 | Higurashi et al. .......... 348/745 |
| 6,369,818 B1 | * | 4/2002 | Hoffman et al. ............. 345/427 |
| 6,753,907 B1 | | 6/2004 | Sukthankar et al. |
| 7,027,049 B2 | * | 4/2006 | Aliaga et al. ................ 345/427 |
| 7,070,283 B2 | * | 7/2006 | Akutsu ......................... 353/69 |
| 7,133,041 B2 | * | 11/2006 | Kaufman et al. ............ 345/419 |
| 7,175,285 B2 | * | 2/2007 | Li et al. ........................ 353/70 |
| 7,215,362 B2 | * | 5/2007 | Klose .......................... 348/189 |
| 7,239,331 B2 | * | 7/2007 | Chernichenko et al. ..... 345/647 |
| 2006/0050074 A1 | * | 3/2006 | Bassi .......................... 345/427 |

OTHER PUBLICATIONS

PCT Notification of Transmittal of The International Search Report and The Written Opinion of the International Searching Authority.

* cited by examiner

*Primary Examiner*—Jingge Wu
*Assistant Examiner*—Jeffrey S Smith
(74) *Attorney, Agent, or Firm*—Sughrue Mion, PLLC

(57) ABSTRACT

Dynamic warp map generation system and corresponding method are disclosed. A compactor obtains spatial transformation parameters along with geometric and optical distortion parameters and combines them to form hybrid grid data in a hybrid vector space. This vector space is divided into hybrid blocks. In each hybrid block, the grid dataset is fitted with a hypersurface and the surface coefficients are saved in an interface. A decompactor obtains dynamic control parameters representing varying distortion parameters and generates a hybrid space vector. According to the hybrid space vector, a warp map is decoded from the hypersurface coefficients that compensates for dynamic geometric and optical distortions. In another example of the present invention, the dynamic warp map generation system is used for color gamut transformation.

28 Claims, 6 Drawing Sheets

DYNAMIC WARP MAP GENERATION SYSTEM AND METHOD

FIELD OF THE INVENTION

This invention relates to electronic image warping, and more particularly to dynamic warp map generation in the case of varying distortions.

BACKGROUND OF THE INVENTION

Two-dimensional digital image processing comprises transforming the digital content of an input image and producing output digital image data to produce an output image. In display systems, in such transformations, the image data suffer intrinsic and situational distortions. Intrinsic distortions are those characteristics of the display system that do not change under different circumstances. Examples of these distortions are tangential and radial lens distortions, the most common case of which are pincushion and barrel distortions.

On the other hand, situational distortions depend on particular circumstances. Common examples of these distortions are horizontal and vertical keystone distortions. Some distortions could be considered intrinsic or situational depending on the particular display characteristics. For instance, geometrical distortions in a rear-projection television are fixed while they change dramatically in a projector, depending of geometry of the screen, e.g. flat or curved, angle of projection, etc.

Electronic image warping is commonly used to compensate for geometric and optical distortions. A discussion of image warping can be found in George Wolberg's "Digital Image Warping", IEEE Computer Society Press, 1988. Many electronic image distortion or transformation algorithms are designed with the primary goal to simplify the hardware implementation. This objective often restricts the complexity and flexibility of the spatial transformation.

U.S. Pat. No. 4,472,732 to Bennett et. al., discloses a method well suited for hardware implementations of real-time image processing systems and decomposes a 2D map into a series of 1D maps, which require only 1D filtering or re-sampling. U.S. Pat. No. 5,175,808 to Sayre and U.S. Pat. No. 5,204,944 to Wolberg et al., disclose methods based on a pixel-by-pixel description. Both approaches are restrictive as not all warps can be separated into 1D warps and a pixel-by-pixel description is not suited for varying distortions, in addition to being very expensive to implement.

Other algorithms for spatial transformations are limited to certain mapping types, such as rotations, linear scaling, affine, and perspective transforms as described in U.S. Pat. No. 4,835,532 to Fant, U.S. Pat. No. 4,975,976 to Kimata et al., U.S. Pat. No. 5,808,623 to Hamburg, and U.S. Pat. No. 6,097,855 to Levien.

In the case of varying distortion parameters, different warp maps are needed for any given situation. One way to handle dynamic warp map assignment is to generate a warp map each time the situation changes. Obviously this method is not efficient, and in the case of real time video applications, it is not practical.

A more efficient way of dynamic warp assignment is to generate a set of warp maps offline and store these maps in a memory. When needed, one of these warp maps is called and used for distortion compensation according to a particular set of distortion parameters. This technique requires substantial memory to store all the warp maps. Accordingly, this method becomes impractical in the case of too many parameters and configurations. Furthermore, the choice of a warp map is limited to a given set of pre-determined distortion parameters, which could greatly compromise the quality of the output image.

It is therefore necessary to devise a dynamic warp generation scheme which is efficient from a hardware implementation point of view, is flexible in terms of the types of distortions allowable, and is able to render high quality output images.

SUMMARY OF THE INVENTION

The present invention provides in one aspect, an electronic system for dynamic m-dimensional digital data transformation, subject to varying N-dimensional distortion and control parameters, said system comprising:
 a. an input interface to obtain m-dimensional transformation data and N-dimensional distortion and control parameter sets,
 b. a concatenation stage coupled to said input interface, to concatenate m-dimensional transformation data and N-dimensional distortion and control parameter sets and to produce m+N dimensional hybrid grid data in a corresponding hybrid vector space,
 c. a divider coupled to said concatenation stage, to divide said hybrid vector space into a plurality of hybrid blocks, consisting of N-dimensional distortion control zones and m-dimensional geometry patches, based on a desired accuracy level,
 d. a surface function estimator, coupled to said divider, to parameterize said hybrid grid data, to generate a hypersurface map in each hybrid block, to estimate said hybrid grid data, wherein said hypersurfaces are represented by a plurality of compacted coefficients,
 e. a surface map interface, coupled to said surface function estimator, to store said compacted coefficients;
 f. a controller, to obtain instantaneous user and control parameters and to generate a vector in the hybrid vector space based on said user and control parameters,
 g. a decoder, coupled to said surface map interface and said controller, to dynamically compute instantaneous warp maps from said compacted coefficients corresponding to said vector in the hybrid vector space, and,
 h. an output interface to store and relay said instantaneous maps.

In another aspect, the present invention provides an electronic system for dynamic two-dimensional digital image transformation described by two-dimensional spatial grid data and varying geometric and optical distortions described by multidimensional parameter data sets, said system comprising:
 a. an input interface to obtain two-dimensional spatial grid data and multidimensional distortion parameter data sets representing varying geometric and optical distortions,
 b. a concatenation stage, coupled to said input interface, to concatenate the multidimensional distortion parameter data sets and the two-dimensional spatial transformation grid data, and to produce hybrid grid data in a corresponding hybrid vector space,
 c. a divider, coupled to said concatenation stage, to divide said hybrid vector space into a plurality of hybrid blocks, consisting of multidimensional distortion control zones and two-dimensional spatial geometry patches, based on a desired accuracy level,
 d. a surface function estimator, coupled to said divider, to parameterize said hybrid grid data to generate a hypersurface map in each hybrid block, represented by a number of compacted coefficients, e. a warp interface, coupled to said surface functional estimator, to store said compacted coefficients representing the hypersurface maps, f. a controller to obtain instantaneous control parameters, including display parameters, distortion parameters, and user parameters, and to calculate hybrid space vectors from said control parameters, g. a decoder, coupled to said compacted warp interface and said controller, to dynamically compute instantaneous warp maps from said compacted coefficients corresponding to said hybrid space vectors, and, h. an output interface to store and relay said instantaneous warp maps.

In another aspect, the present invention provides an electronic method for dynamic m-dimensional digital data transformation, subject to varying N-dimensional distortion and control parameters, said method comprising:

a. obtaining m-dimensional transformation data and N-dimensional distortion and control parameter sets, b. concatenating the m-dimensional transformation data and N-dimensional distortion and control parameter sets and producing m+N dimensional hybrid grid data in a corresponding hybrid vector space, c. dividing said hybrid vector space into a plurality of hybrid blocks, consisting of N-dimensional distortion control zones and m-dimensional geometry patches, based on a desired accuracy level, d. parameterizing said hybrid grid data to generate a hypersurface map in each hybrid block to estimate said hybrid grid data, wherein said hypersurfaces are represented by a plurality of compacted coefficients, e. storing said compacted coefficients, f. obtaining instantaneous user and control parameters and generating a vector in the hybrid vector space based on said user and control parameters, g. dynamically computing instantaneous warp maps from said compacted coefficients corresponding to said vectors in the hybrid vector space obtained in "f", and, h. storing and relaying said instantaneous warp maps.

In another aspect the invention provides an electronic method for dynamic two-dimensional digital image transformation described by two-dimensional spatial grid data and varying geometric and optical distortions described by multidimensional parameter data sets, said method comprising:

a. obtaining the two-dimensional spatial grid data and multidimensional distortion parameter data sets representing varying geometric and optical distortions, b. concatenating the multidimensional distortion parameter data sets and the two-dimensional spatial grid data, to produce hybrid grid data in a corresponding hybrid vector space, c. dividing said hybrid vector space into a plurality of hybrid blocks, consisting of multidimensional distortion control zones and two-dimensional spatial geometry patches, based on a desired accuracy level and, d. parameterizing said hybrid grid data to generate a hypersurface in each hybrid block, wherein the hypersurface estimates the hybrid grid data, and wherein the hypersurface is represented by a number of compacted coefficients, e. storing said compacted coefficients representing the hypersurface maps, f. obtaining instantaneous control parameters, including display parameters, distortion parameters, and user parameters, and calculating hybrid space vectors based on said control parameters, g. dynamically computing instantaneous warp maps from said compacted coefficients corresponding to said hybrid space vectors obtained in "f", and, h. storing and relaying said instantaneous warp maps.

Further details of different aspects and advantages of the embodiments of the invention will be revealed in the following description along with the accompanying drawings.

DETAILED DESCRIPTION OF THE INVENTION

Figure 1:
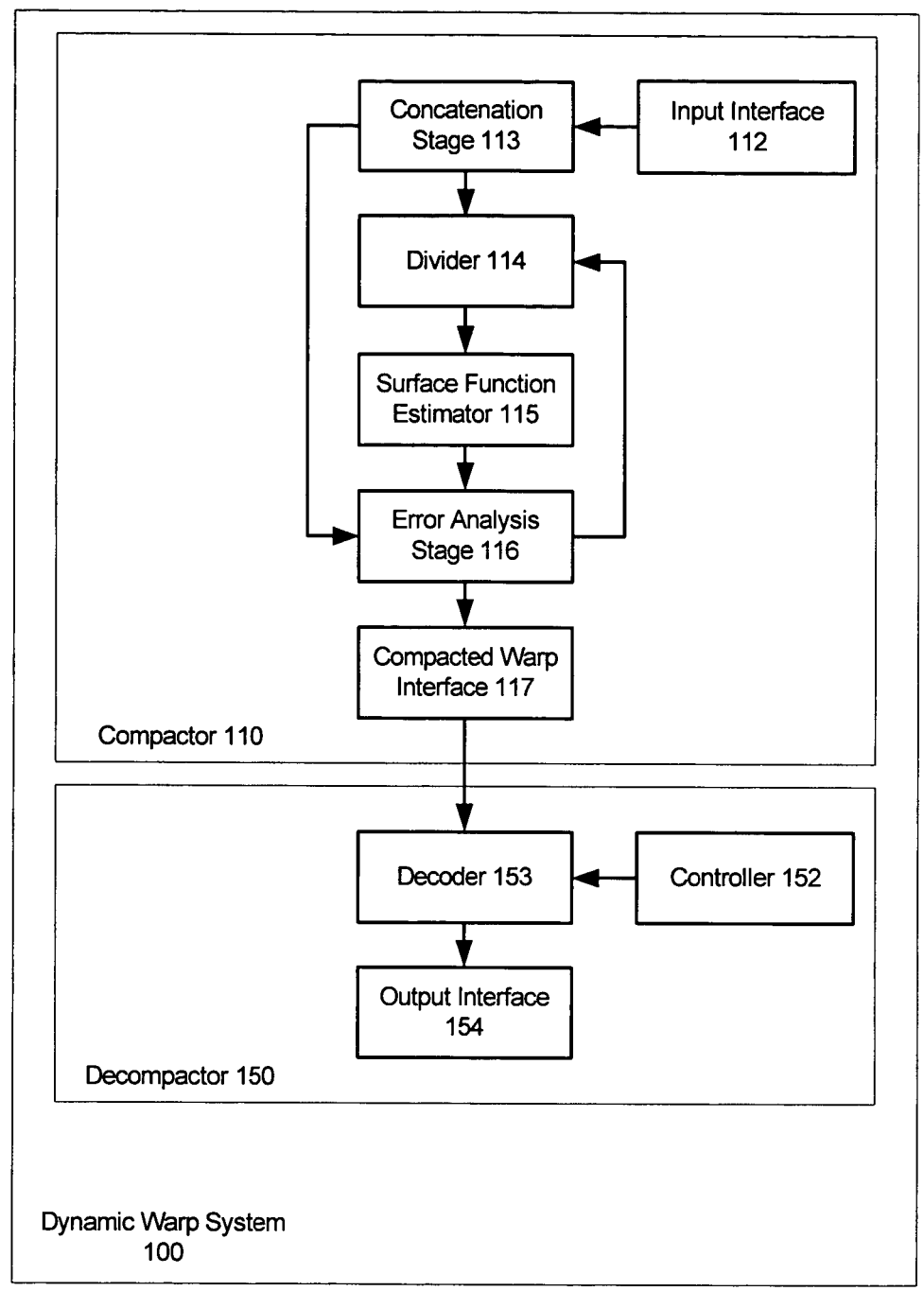
FIG. 1 is a block diagram of a dynamic warp system built in accordance with the present invention.

Reference is first made to FIG. 1 that illustrates an example of a dynamic warp system 100 made in accordance with the present invention. Dynamic warp system 100 comprises compactor 110 and decompactor 150. Compactor 110 comprises input interface 112, concatenation stage 113, divider 114, surface function estimator 115, error analysis stage 116, and compacted warp interface 117. Decompactor 150 comprises controller 152, decoder 153, and output interface 154.

In any display system there are optical and geometric distortions associated with a set of distortion parameters. Some of these parameters represent the geometric transformation specific to a display system. For instance, the shape and size of the display surface in a projection system are important geometric parameters. A curved display surface, for example, has a specific surface maps with associated parameters. Other geometric parameters may define situational distortions. For example, the horizontal and vertical keystone angles associated with keystone distortions. Similarly, optical distortions (e.g. tangential and radial lens imperfections, lens offset, etc.), could also be characterized by specific optical parameters. Each unique combination of distortion parameters defines a unique spatial transformation, which will warp the image accordingly.

The spatial transformation, or warp map, is basically a two-dimensional (2D) transformation assigning (in the inverse formalism) input pixel coordinates to every output pixel. The 2D spatial transformation is stated in the form of grid data values. The grid data can be viewed as a "parameterization" of the spatial transformation, which, as described above, is in turn determined by the distortion parameters. The spatial transformation assigns input coordinates to output coordinates. If (X,Y) represent the coordinates of a pixel, P, in the output space, and (U,V) represent the coordinates of the mapped pixel, P', in the input space, the spatial 2D transformation is represented by:

(X,Y)→(U,V)

If there is a relation like this for every output pixel, then every output pixel coordinate is mapped onto an input pixel coordinate and this is called a grid data representation of the transformation. Mapping the output pixel coordinates onto the input pixel coordinate space, or so-called "inverse mapping", has the advantage that there will be no output pixels unassigned and hence no "holes" in the output image. In this invention, inverse mapping is used.

In general, the grid data description can be summarized by the following formal equations:

$$U = F_u(X,Y)$$

$$V = F_v(X,Y)$$

These equations state that a pixel in the output image, with coordinates (X,Y), is mapped via the spatial transformation $F=(F_u,F_v)$, to a pixel in the input image, with coordinates (U,V). Accordingly, the grid data relation $\{(U_i,V_i),(X_i,Y_i)\}$, specifies a set of pixels $\{(X_i,Y_i)\}$ in the output space, which are inversely mapped onto the pixels $\{(U_i,V_i)\}$ in the input space. This is equivalent to a pixel-by-pixel description for the set of pixels $\{(X_i,Y_i)\}$.

Grid data description, though very accurate, takes a substantial amount of hardware resources and, as such, is an inefficient way to implement a 2D transformation electronically. Hence, in electronic image processing, surface fitting, which applies to both single-pass and two-pass methods, is the preferred way of describing a 2D spatial transformation. Surface fitting gives an accurate description that simultaneously incorporates the geometric behavior in both directions.

As mentioned above, in any realistic display system, there are geometric and optical distortions present. These distortions could be either constant or dynamically changing. A set of distortion parameters is therefore associated with any particular setting. Vivid examples of varying distortion parameters are keystone distortion angles in a projection system. For a given distortion type, there could be one or many associated parameters. Therefore these parameters are determined as points or vectors in a multidimensional space.

Input interface 112 obtains 2D spatial transformation parameters (i.e. grid data), as well as multidimensional distortion parameters, for all the unique distortions of a given system in a given situation, and relays them to concatenation stage 113. Any unique distortion is defined by the same types of parameters, albeit with different values, such as horizontal/vertical keystone angles. Hence the distortion parameters are referred to as distortions of the same type. The function of the concatenation stage 113 is to merge the two vector spaces of 2D spatial grid data and multidimensional distortion parameters and to produce a combined vector space for the hybrid parameters, (i.e. hybrid=spatial+distortion parameters). These data form a new hybrid parameter space. For example if (X,Y) represent output pixel coordinates, (U,V) input pixels, and (d,θ,φ, . . . ) represent a set of distortion parameters including the lens offset, vertical and horizontal keystone angles, the combined hybrid parameter space is denoted by:

$$(U,V) \times (X,Y,d,\theta,\phi, \ldots).$$

The notation used is to separate the hybrid space domain (X,Y,d,θ,φ, . . . ) from the range (U,V), that is points in the hybrid space domain are mapped to points in the range. The concatenation stage 113 performs this merging to obtain a hybrid grid dataset as explained in further detail below.

The distortion component of the hybrid space domain will be hereafter referred to as the "control space". Each vector in the control space corresponds to a unique set of values for N distortion parameters, which identify a warp map for a 2D spatial transformation. Each warp map is therefore identified by a unique N-vector of control parameters, $\vec{\alpha}_g$:

$$\vec{\alpha}_g = (\alpha_g^1, \alpha_g^2, \ldots, \alpha_g^N),$$

where N labels the number of distortion parameters (geometric and optical) and g indexes the specific warp. In the case of keystone distortions, two of the control parameters $\alpha_g^i$ correspond to keystone angles. The vector notation $\vec{\alpha}$ is used to refer to the N distortion parameters as a whole, without references to a specific warp.

For a total of G different warp maps, g=1, . . . , G, the set of control vectors are identified as:

$$S_{\vec{\alpha}} = \{\vec{\alpha}_1, \vec{\alpha}_2, \ldots, \vec{\alpha}_G\}.$$

Each warp map, identified by a unique $\vec{\alpha}_g$, has grid data associated with its spatial component. These grid data can be expressed as the relation:

$$\{(U_i^g, V_i^g),(X_i^g, Y_i^g)\}, i=1, \ldots, M_g,$$

where, $M_g$ gives the number of spatial points for warp g corresponding to $\vec{\alpha}_g$. Concatenation stage 113 combines the spatial data with the corresponding distortion data to form the hybrid relation for warp g:

$$\{(U_i^g, V_i^g),(\vec{\alpha}_g, X_i^g, Y_i^g)\}, i=1, \ldots, M_g$$

Lastly, taking the hybrid relations for all warps gives the hybrid grid data as:

$$\{(U_i^g, V_i^g),(\vec{\alpha}_g, X_i^g, Y_i^g)\}, i=1, \ldots, M_g, g=1, \ldots, G.$$

This grid data relation maps points in the hybrid space domain, $(\vec{\alpha}_g, X_i^g, Y_i^g)$, to points in the input coordinate space $(U_i^g, V_i^g)$. In one example of the invention, concatenation stage 113 is adapted to reduce the number of grid points by sub-sampling. Sub-sampling is commonly achieved by dropping data points at regular intervals. This is necessary if the dataset is very large, which can considerably strain the fitting at the surface function estimator stage.

Figure 2A:
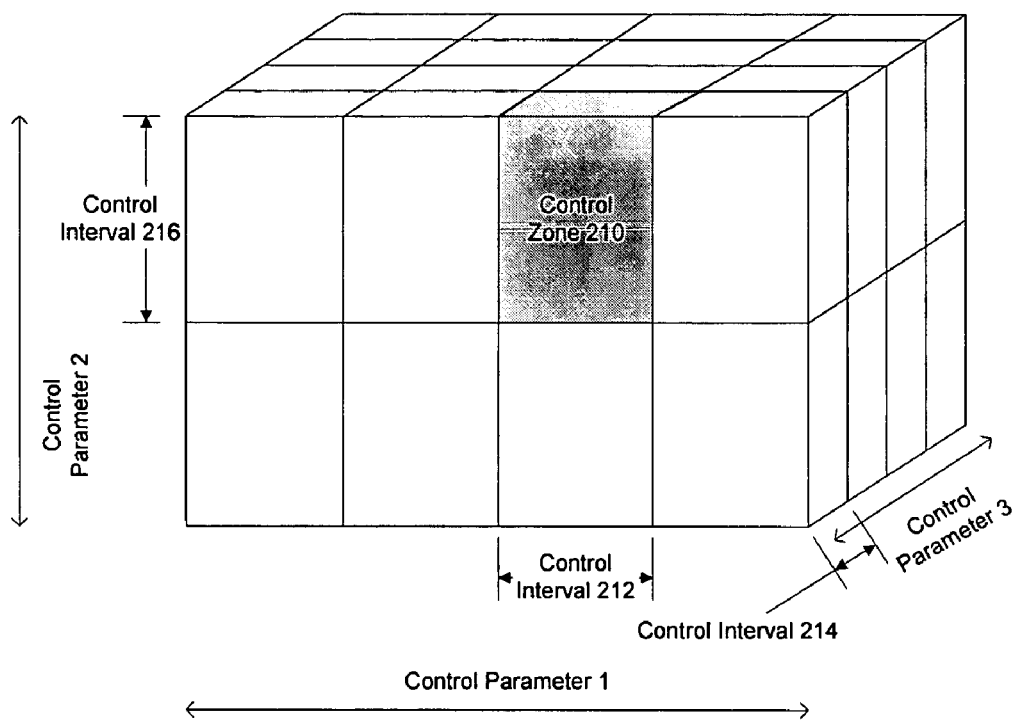
FIG. 2A is a graphical representation of a three-dimensional control space division.

Divider 114 receives the concatenated parameters, or hybrid grid data from concatenation stage 113, and divides up the hybrid space domain $(\vec{\alpha}, X, Y)$ into hybrid blocks. Each hybrid block consists of a "control zone" and a spatial geometry patch. The control space (i.e. the distortion component of the hybrid space domain) is divided into control zones 210 as shown in FIG. 2A. In addition, divider 114 also divides the coordinate space into spatial geometry patches. In each hybrid block, the control zone is a hyper volume delineated by control parameter intervals. In FIG. 2A, three control intervals 212, 214, and 216 are shown, delineating the shaded control zone 210. In general, for a control parameter $\alpha^i$, its domain $P_{min}^i \leq \alpha^i \leq P_{max}^i$ is divided into $B_i$ intervals with boundaries:

$$S_{P^i} = \{P_0^i = P_{min}^i, P_1^i, \ldots, P_{B_1}^i = P_{max}^i\}.$$

For N control parameters, there are N such control intervals, one from each control parameter domain, delineating a control zone. There are a total of $B = B_1 B_2 \ldots B_N$ control zones. Each control zone can be identified by its upper boundary indices. For example, $Z_C(\vec{\beta})$, $\vec{\beta}=(\beta_1,\beta_2,\ldots,\beta_N)$ gives the control zone with extent:

$$Z_C(\beta_1, \beta_2, \ldots, \beta_N) = \begin{cases} P^1_{\beta_1-1} \le \alpha^1 \le P^1_{\beta_1} \\ P^2_{\beta_2-1} \le \alpha^2 \le P^2_{\beta_2} \\ \vdots \\ P^N_{\beta_N-1} \le \alpha^N \le P^N_{\beta_N} \end{cases}$$

$$\beta_i = 1, \ldots, B_i$$

The volume of control zone $Z_C(\vec{\beta})$, denoted by $V(\vec{\beta})$, is given by:

$$V(\vec{\beta})=(P_{\beta_1}^1-P_{\beta_1-1}^1)\times(P_{\beta_2}^2-P_{\beta_2-1}^2)\times \ldots (P_{\beta_N}^N-P_{\beta_N-1}^N).$$

The zone division of the control space is based upon a trade-off between a desired accuracy in surface fitting and available hardware resources. The more control zones, the greater the accuracy, however, the more computation power and storage space required. The control zones do not have to be of equal volume, and the boundary positions can be independently varied for optimization.

Figure 2B:
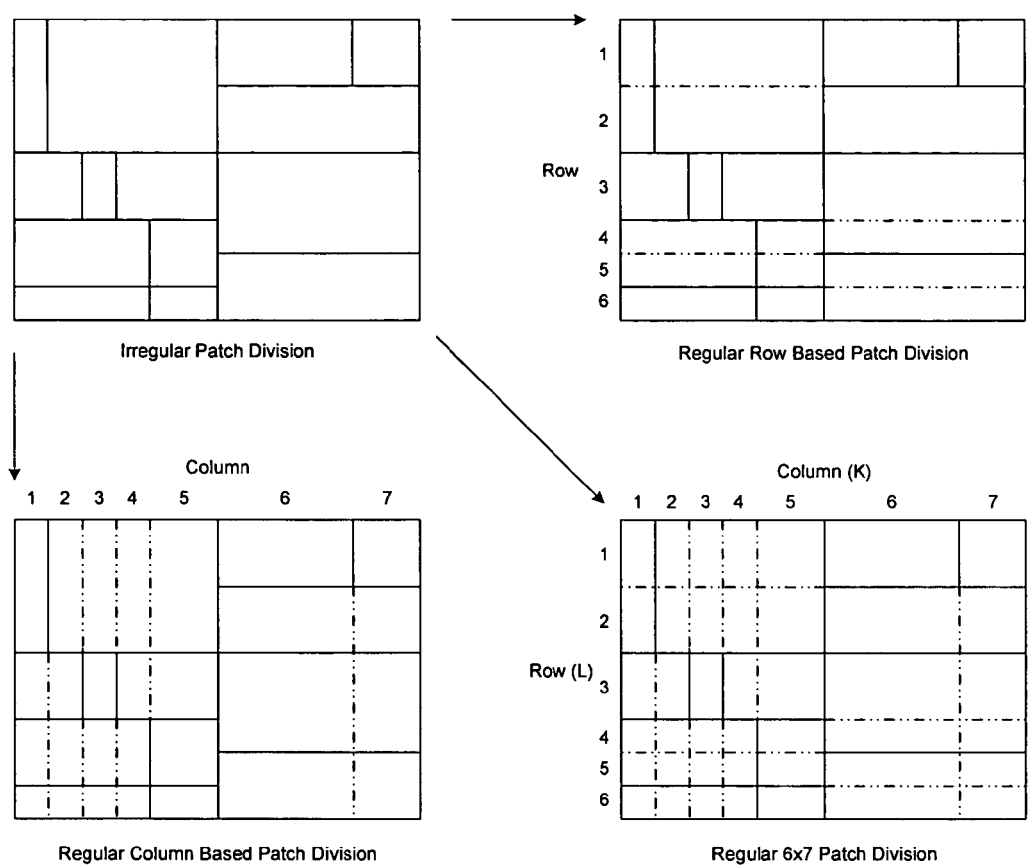
FIG. 2B is a graphical representation of a two-dimensional coordinate space division.

The division of the coordinate space into geometry patches proceeds in an analogous manner as shown in FIG. 2B. The coordinate space, with coordinates (X,Y), has a domain size of [0,W]×[0,H], that is:

$$0 \le X \le W$$

$$0 \le Y \le H$$

This domain is divided into K spatial intervals horizontally (in X) and L spatial intervals vertically (in Y). This gives a total of KL patches, in an L×K rectangular array type arrangement as in FIG. 2B. The patch boundaries are given by:

$$S_{P^x}=\{P_0^x=0,P_1^x,\ldots,P_K^x=W\}$$

$$S_{P^y}=\{P_0^y=0,P_1^y,\ldots,P_L^y=H\}$$

Each geometry patch can be identified by its upper boundary indices, hence $Z_p(k,l)$ gives the patch with extent:

$$Z_p(k,l) = \begin{cases} P^x_{k-1} \le x \le P^x_k \\ P^y_{l-1} \le y \le P^y_l \end{cases}$$

$$k = 1, \ldots, K$$

$$l = 1, \ldots L$$

The geometry patch division is also determined by a trade-off between desired accuracy in surface fitting and available hardware resources. Complex warps will require more geometry patches, hence more computational power and storage space, to achieve the same level of accuracy. In principle, a geometry patch can be assigned to every set of four adjacent pixel points, however, this would require a large amount of memory to store the spatial transformation. The basis functions can also be varied to optimize the trade-off. The geometry patches do not have to be the same size but, as implied by the equations, should fit together in a regular manner. The term "regular" in this context is intended to mean that the geometry patches can be arranged into rows and/or columns. This is not restrictive since any division by rectangular geometry patches can be brought to a regular arrangement. Both regular and irregular geometry patch divisions are shown in FIG. 2B. It is shown there how to achieve a regular geometry patch scheme without sacrificing the level of subdivision.

As can be seen from FIG. 1, division into control zones and geometry patches is an iterative procedure. On the first iteration, a small number of zones/patches, say a single control zone and a single geometry patch, can be used. A control zone together with a geometry patch, defines a N+2 dimensional hyper-cube in the hybrid parameter space, hence divider 114 can be viewed as dividing the hybrid space into hyper-cubes or "hybrid blocks".

Surface function estimator 115, receives the hybrid grid dataset and the hybrid domain division information (i.e. arrangement of control zones and geometry patches) from divider 114. Surface function estimator 115 then fits the hybrid grid dataset with a single hypersurface in each hybrid block. Each input coordinate is fitted separately, giving two hypersurfaces, one for U, and one for V. In one example of the invention, each hybrid block is fitted independently. In another example implementation of the present invention, all the blocks are fitted together. The finer the division of the hybrid domain the more accurate the hypersurface fit. Each point on the fitted hypersurface represents a specific spatial coordinate in a specific warp map. The hypersurface is N+2 dimensional.

Surface function estimator 115 transforms the hybrid data from a discrete gird data form to a closed functional form, substantially reducing the amount of parameters. The method of fitting and basis functions used can be variable. In one example of the present invention, a linear least squares approach with a tensor product polynomial based basis (such as a tensor product Bezier basis or B-spline basis) is used. The equations below reflect this linear and tensor product form, though the basis is kept general. The data for the two hyper surfaces, after rearranging the indices, can be written as:

$$\{U_i \leftarrow (X_i,Y_i,\alpha_i^1,\alpha_i^2,\ldots,\alpha_i^N)\}, i=1,\ldots,G \times M_g$$

$$\{V_i \leftarrow (X_i,Y_i,\alpha_i^1,\alpha_i^2,\ldots,\alpha_{iN})\}, i=1,\ldots,G \times M_g$$

The surface basis functions are denoted by:

$$F^i(x), i=0,\ldots,I$$

$$F^j(y), j=0,\ldots,J$$

$$F^{\gamma_n}(\alpha^n), \gamma_n=0,\ldots,\Gamma_n, n=1,\ldots,N$$

The basis dimensions are given by $I+1, J+1, \Gamma_n+1$ for X,Y and $\alpha^n$ respectively. For the standard polynomial basis, the basis functions are:

$$F^i(x)=x^i$$

$$F^j(y)=y^j$$

$$F^{\gamma_n}(\alpha^n)=(\alpha^n)^{\gamma_n}$$

Making the surface fit, the hypersurfaces obtained are:

$$u^{kl\vec{\beta}}(x,y,\vec{\alpha}) = \sum_{i=0}^{I}\sum_{j=0}^{J}\sum_{\gamma_1=0}^{\Gamma_1}\ldots\sum_{\gamma_N=0}^{\Gamma_N} a_{ij\gamma_1\ldots\gamma_N}^{kl\beta_1\ldots\beta_N} F^i(x)F^j(y)F^{\gamma_1}(\alpha^1)\ldots F^{\gamma_N}(\alpha^N)$$

-continued $$v^{kl\vec{\beta}}(x, y, \vec{\alpha}) = \sum_{i=0}^{I}\sum_{j=0}^{J}\sum_{\gamma_1=0}^{\Gamma_1}\cdots\sum_{\gamma_N=0}^{\Gamma_N} b_{ij\gamma_1\ldots\gamma_N}^{kl\beta_1\ldots\beta_N} F^i(x)F^j(y)F^{\gamma_1}(\alpha_1)\ldots F^{\gamma_N}(\alpha_N)$$

$P_{k-1}^x \leq x \leq P_k^x,\ P_{l-1}^y \leq y \leq P_l^y,\ P_{\beta_n-1}^n \leq \alpha_n \leq P_{\beta_n}^n$, (patch/zone boundaries)

$k = 1, \ldots, K, l = 1, \ldots L, \beta_n = 1, \ldots, B_n$, (patch/zone indices)

$n = 1, \ldots, N$ (control parameter index)

In the above, lower case letters, x, y, u, v, have been used for the coordinate parameters in the functional form. Each hypersurface, consists of many component surfaces, indicated by the superscripts kl$\vec{\beta}$, which are the fitted surfaces restricted to the patch/zone $Z_P(k,l) \times Z_C(\vec{\beta})$. Thus, $u^{kl\vec{\beta}}$ simply means the hypersurface restricted to $Z_P(k,l) \times Z_C(\vec{\beta})$. The a's and b's are the surface coefficients, that, along with the hybrid domain division information, define the surface:

$$a_{ij\gamma_1\ldots\gamma_N}^{kl\beta_1\ldots\beta_N} \quad b_{ij\gamma_1\ldots\gamma_N}^{kl\beta_1\ldots\beta_N}$$

$i = 0, \ldots, I, \quad j = 0, \ldots, J, \quad \gamma_n = 0, \ldots, \Gamma_n$ $k = 1, \ldots, K, \quad l = 1, \ldots L, \quad \beta_n = 1, \ldots, B_n$ $n = 1, \ldots, N$ At this stage, surface function estimator 115 has, in essence, made the transformation from a large multidimensional dataset of points to a small number of surface coefficients. For the common case of having the same number of spatial points for each warp ($M_g$ independent of g), the change in storage numbers is:

$$M \times G \Rightarrow K \times L \times (I+1) \times (J+1) \times \prod_{n=1,\ldots,N} B_n \times \prod_{n=1,\ldots,N}(\Gamma_n + 1).$$

Though deceiving, this is a substantial reduction of data. As an example, consider a typical hybrid grid dataset description for warping a VGA image of 640×480 points (=M) for a total of 81×61 (=G) keystone positions (horizontal angles from −40 to +40 degrees in 1 degree steps and vertical angles from −30 to +30 degrees in 1 degree steps). It should be understood that in a grid description, all pixels must have their data given. This corresponds to a total of approximately 1.5 billion data points using the grid (pixel-by-pixel) approach. With the surface description, reasonable accuracy (<=2 pixel error) can be obtained with K=2,L=2, I=3,J=3,$B_1$=6,$B_2$=6,$\Gamma_1$=3,$\Gamma_2$=3. Here the control indices 1, and 2 correspond to the horizontal and vertical keystone angles. The result is a total of 36864 coefficients, a substantial reduction in data. Even a reduction in the number of coordinates to 17×13, (which will require some interpolation at a later stage to obtain the coordinates for the dropped points) gives a total of 1.1 million points, with the hypersurface giving a 30 times improvement.

Once the hypersurfaces are obtained, error analysis stage 116 evaluates the hypersurfaces to obtain a set of computed coordinates in the input space. The computed coordinates are generated at the domain points contained in the hybrid grid dataset, which error analysis stage 116 receives independently from concatenation stage 113. Let ($U_i^C, V_i^C$), denote the computed coordinate at the hybrid domain point ($X_i, Y_i, \vec{\alpha}_i$), then these are generated using the following equations:

$$U_i^C = u(X_i, Y_i, \vec{\alpha}_i)$$

$$V_i^C = v(X_i, Y_i, \vec{\alpha}_i)$$

In the above, the kl$\vec{\beta}$ superscripts have been removed and the notation indicates the full hypersurfaces, which include all the component surfaces. During evaluation of these equations, the component surface corresponding to the block to which ($X_i, Y_i, \vec{\alpha}_i$) belong is selected. For example, if ($X_i, Y_i, \vec{\alpha}_i$) lie in $Z_P(k,l) \times Z_C(\vec{\beta})$, then $u = u^{kl\vec{\beta}}$. Error analysis stage 116 compares these computed values with the exact coordinates ($U_i, V_i$) taken from the hybrid grid dataset. It then determines whether a preset error tolerance level condition has been satisfied. This condition takes the form:

$$\|((U_i - U_i^C), (V_i - V_i^C))\| \leq E_{max}$$

Here the maximum allowable error is $E_{max}$, and the norm $\|\cdot\|$ can be any appropriate distance function, the most commonly used norms being:

$$\|\cdot\| = \sqrt{(U_i - U_i^C)^2 + (V_i - V_i^C)^2}$$

$$\|\cdot\| = |U_i - U_i^C| + |V_i - V_i^C|$$

It is also possible to set independent tolerances levels for each coordinate, for example:

$$|U_i - U_i^C| \leq E_{max}^u$$

$$|V_i - V_i^C| \leq E_{max}^v$$

The error condition simply states that the computed coordinates should approximate the exact coordinates accurately. If the preset tolerance level condition is not satisfied (i.e. the distance is greater than the tolerance level), then error analysis stage 116 sends the results back to divider 114. The results sent to divider 114 consist of a listing of the domain points at which the error was larger than the tolerance level. These domain points are referred to as broken points. Based on these results, divider 114 further subdivides the hybrid domain space. Only those blocks, where the errors are larger than the tolerance level are subdivided. As discussed above, the blocks where the errors are larger than the tolerance level can be determined from the listing of broken points.

Subdivision can occur at the control zone level, where only specific control intervals are divided, at the geometry patch level, where only specific spatial intervals are divided, or a combination of the two. These steps are repeated until the desired accuracy is obtained and tolerance levels are met. By increasing the number of geometry patches and/or control zones, the maximum error obtained can be reduced to an arbitrarily small value, implying that successive sub-divisions can eventually meet any tolerance level. However, a practical limit is normally set by hardware limitations (each subdivision increases the amount of data storage) and application specific criteria. After a certain number of subdivisions, the process becomes redundant, as the accuracy gained is small with no noticeable improvement to warping quality. In the extreme limit, every domain point sits on a block vertex, which essentially becomes a pixel-by-pixel description of the transformation at every control vector.

The complete hypersurface, after error conditions have been met, is defined by the surface coefficients, and the hybrid space division data, that is, the configuration of the control zones and geometry patches. This data is summarized below:

$$S_{p^i} = \{P_0^i = P_{min}^i, P_1^i, \ldots, P_{B_i}^i = P_{max}^i\}$$
$$S_{p^x} = \{P_0^x = 0, P_1^x, \ldots, P_K^x = W\}$$
$$S_{p^y} = \{P_0^y = 0, P_1^y, \ldots, P_L^y = H\}$$
$$a_{ij\gamma_1\ldots\gamma_N}^{kl\beta_1\ldots\beta_N} \quad b_{ij\gamma_1\ldots\gamma_N}^{kl\beta_1\ldots\beta_N}$$
$$i = 0, \ldots, I, \quad j = 0, \ldots, J, \quad \gamma_n = 0, \ldots, \Gamma_n$$
$$k = 1, \ldots, K, \quad l = 1, \ldots L, \quad \beta_n = 1, \ldots, B_n$$
$$n = 1, \ldots, N$$

The hypersurface coefficients are referred to as "compacted coefficients". By obtaining the hypersurface, the many warp maps, described via the grid dataset, have been replaced by a small set of compacted coefficients. Compacted warp interface 117 stores the hypersurface data (coefficients and division data) and relays them upon request to decompactor 150. The function of compactor 110 is therefore preparing these compacted coefficients from a set of distortion and spatial transformation parameters, and storing these compacted warp coefficients in an interface in order to relay the coefficients upon request. This makes for easy, dynamic access to a great number of warp maps. Warp maps are obtained by evaluating the hypersurface at specific control vectors, which is done by the decompactor 150.

Figure 3A:
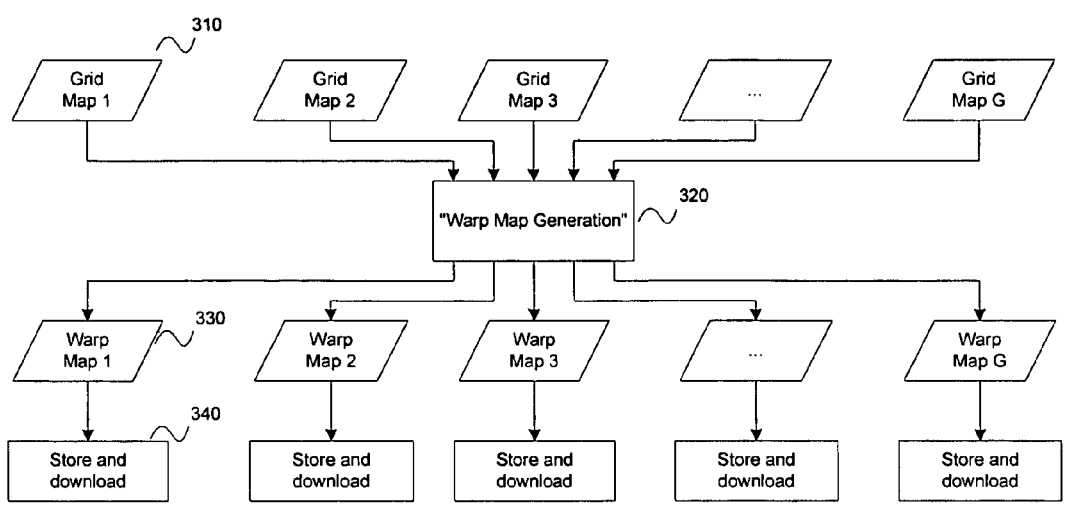
FIG. 3A is an illustration of a prior art method for generating a warp set with different warp maps from different grid maps.

FIG. 3A illustrates a typical prior art method to access numerous warp maps. The method consists of acquiring grid maps 310 for warp map generation 320. Each generated warp map 330 is then ready to store and download at step 340. Specifically, the method involves storing a set of warp maps as 2D fitted surfaces. Storing the warp maps requires substantial hardware resources. To be efficient, a device based on this prior art method would require large memory interfaces. Moreover, the method would require rapid access to memories each time a warp map is needed "on the fly". A large and fast memory device is costly. Furthermore, the distortion parameter are restricted to certain discrete values and the accuracy of the warp map with respect to the actual distortion parameters depends on how close the actual values are to preset values.

Figure 3B:
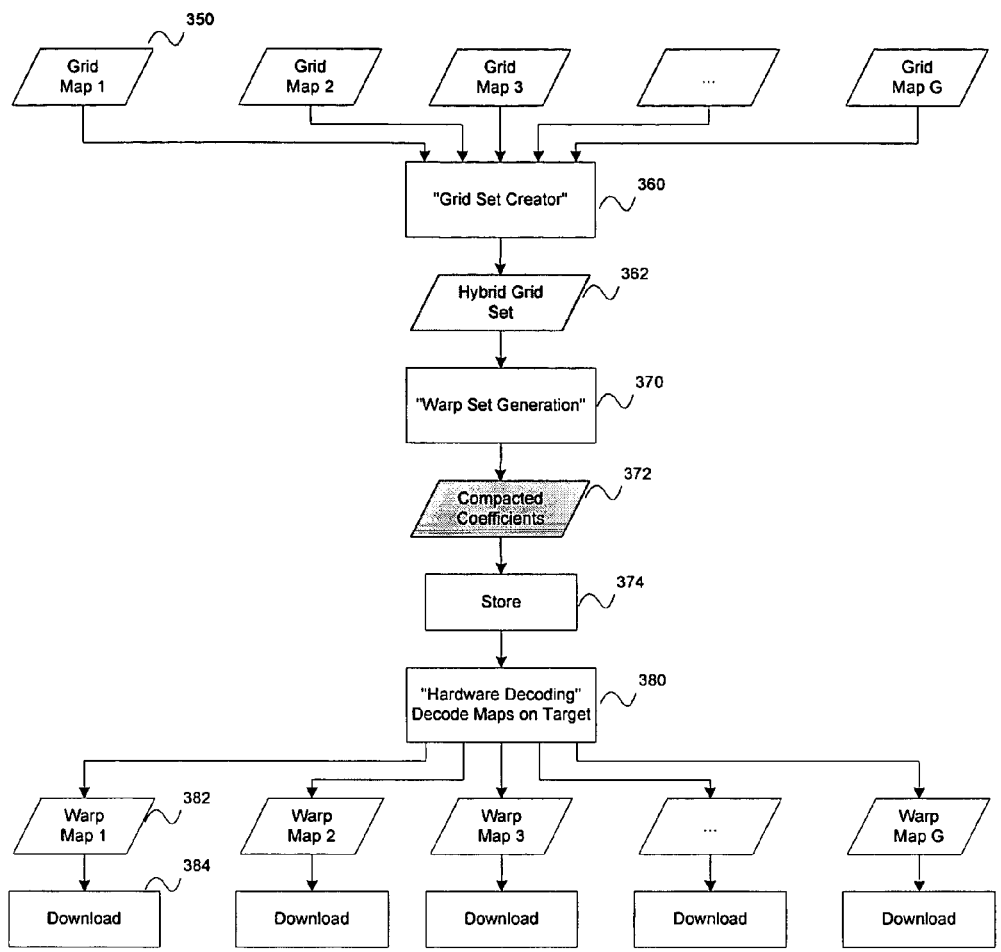
FIG. 3B is an illustration of the method of the present invention for generating different warp maps; and, FIG. 4 is a flow logic representation of an example of the present invention.

In contrast, FIG. 3B illustrates the compactor-decompactor method for the method of the present invention. In this method, individual grid maps 350 are acquired by grid set creator 360, which outputs hybrid grid set 362. A warp set is generated at step 370, which outputs compacted coefficients 372. These coefficients are stored at step 374, and upon request, are read out and decoded at step 380 to dynamically generate a specific warp map 382, which is downloaded at step 384. In the present method of decompacting, a surface evaluation is conducted in each control zone and geometry patch to smooth out the differences.

In the decompactor subsystem 150, the hypersurface is evaluated, or decoded, at a specific vector in control space to obtain a 2D surface that represents the original 2D spatial transformation for those specific control values, (i.e., distortion parameters). The decoding of hypersurface to warp map is referred to as decompaction. The 2D surface coefficients are the "warp coefficients", as they define the warp map. The compacted coefficients can be viewed as a compression of the warp coefficients. After the decoding the 2D surface can be evaluated at a specific vector in the spatial space, which is simply a grid point $(X_i, Y_i)$, to obtain the mapped grid point $(U_i, V_i)$, hence recovering the original grid data description $\{(U_i, V_i), (X_i, Y_i)\}$. This process is detailed below.

Controller 152 obtains the specific parameters including the desired setting and user parameters. It then translates these specific parameters into control parameters corresponding to a vector $\vec{\alpha}_0 = (\alpha_0^1, \alpha_0^2, \ldots, \alpha_0^N)$ in the control space. Controller 152 then passes the control space vector to the decoder 153. As an example, the control parameters might be the keystone angles and throw ratio for a particular projector setup.

Decoder 153 takes the control parameters and determines the control zone $Z_C(\vec{\beta}_0)$ to which they belong. Next, the appropriate component hypersurface is evaluated at $\vec{\alpha}_0$ to obtain a 2D surface u(x,y), as defined below:

$$u(x, y) = \{u^{kl}(x, y)\}$$
$$u^{kl}(x, y) = \sum_{i=0}^{I} \sum_{j=0}^{J} \bar{a}_{ij}^{kl} F^i(x) F^j(y)$$
$$\bar{a}_{ij}^{kl} = \sum_{\gamma_1=0}^{\Gamma_1} \cdots \sum_{\gamma_N=0}^{\Gamma_N} a_{ij\gamma_1\ldots\gamma_N}^{kl\beta_0} F^{\gamma_i}(\alpha_0^1) \ldots F^{\gamma_N}(\alpha_0^N)$$
$$P_{k-1}^x \le x \le P_k^x, P_{l-1}^y \le y \le P_l^y, \text{(patch boundaries)}$$
$$k = 1, \ldots, K, l = 1, \ldots L, \text{(patch indices)}$$

Similar equations describe the 2D surface v(x,y). In evaluating the hypersurface, a reduction from a N+2 dimensional surface to a 2D surface has been made. In particular there is no control space dependence in u(x,y), as it is defined entirely on the (X,Y) coordinate space. The 2D surfaces u(x,y) and v(x,y) represent the original 2D spatial transformation, or the warp map, at control parameters $\vec{\alpha}_0$. The warp coefficients are:

$$\bar{a}_{ij}^{kl} \quad \bar{b}_{ij}^{kl}$$
$$i = 0, \ldots, I, \quad j = 0, \ldots, J$$
$$k = 1, \ldots, K, \quad l = 1, \ldots L$$

This "de-compaction" procedure allows dynamic generation of warp maps for any control vector. Once the hypersurface has been obtained, the decompactor only needs the control vector as input to generate the map. Furthermore, since the warp maps are in functional form, i.e. a 2D surfaces rather than discrete grid data, they can easily be scaled (zoom or shrink) or flipped horizontally or vertically or both. Scaling and flipping operations are simple transformations of the above warp coefficients. An example application consists of a display converter to generate a map to fit a particular display surface from a standard normalized set by performing scaling operations.

Once a map is obtained, it can be evaluated at the output space coordinates $(X_i, Y_i)$, recovering the original grid data for the 2D spatial transformation associated with distortion $\vec{\alpha}_0$. The evaluation of u(x,y), will give computed coordinates $(U_i^C, V_i^C)$ (note the index i(=1, . . . ,$M_0$) here is over the coordinate space only rather than the entire hybrid domain):

$$U_i^C = u(X_i, Y_i)$$

$$V_i^C = v(X_i, Y_i)$$

During evaluation of these equations, the 2D component surface corresponding to the geometry patch to which $(X_i, Y_i)$ belong is selected. For example, if $(X_i, Y_i)$ lie in $Z_P(k,l)$, then $u=u^{k,l}$. Due to the error reduction performed by the error analysis stage, the computed coordinates will match the original coordinates within the tolerance level:

$$\left. \begin{array}{l} U_i^C = U_i \\ V_i^C = V_i \end{array} \right\} \text{within tolerance level}$$

Therefore, $\{(U_i^C, V_i^C),(X_i, Y_i)\}$ reproduces the starting grid relation $\{(U_i, V_i),(X_i, Y_i)\}$ for the requested transformation.

Figure 4:
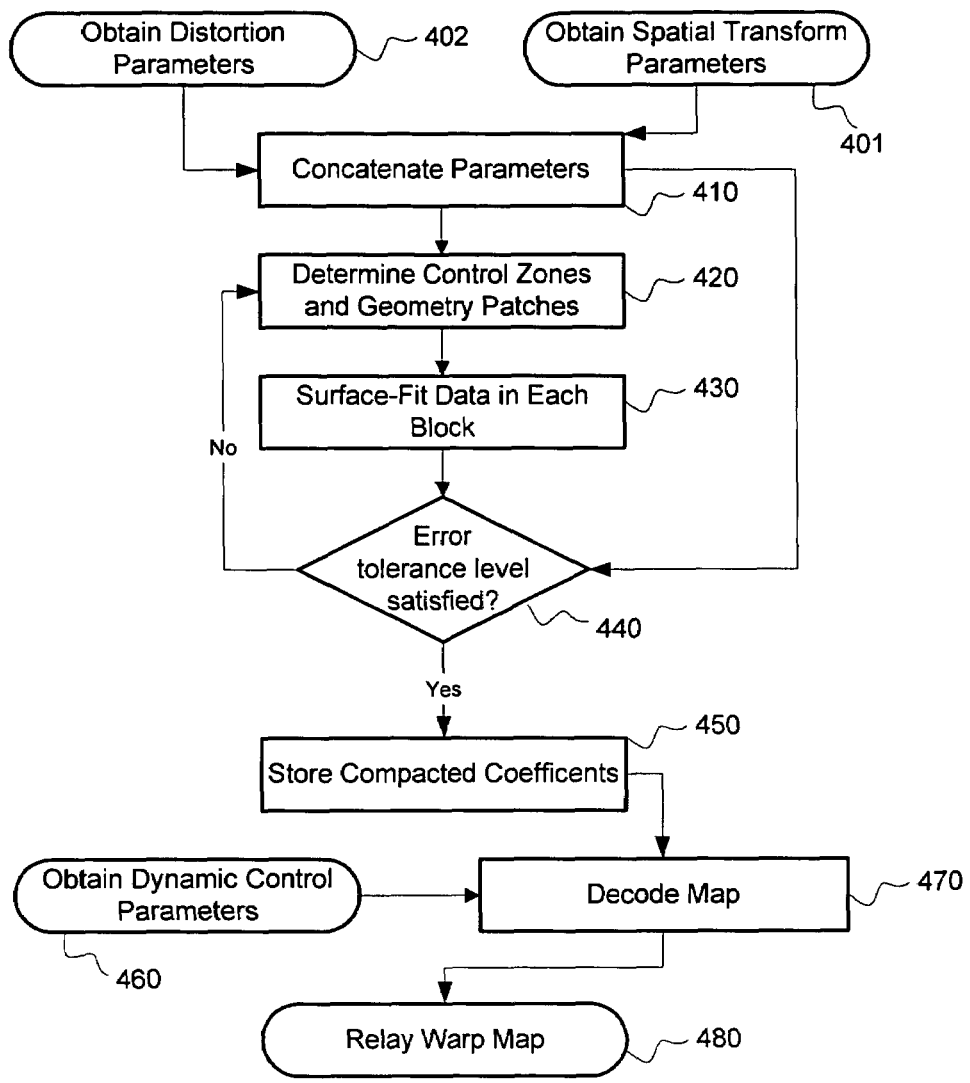

FIG. 4 shows the logic flow diagram of dynamic warp system 100. At steps 401 and 402, spatial transformation and distortion parameters are obtained. At step 410, 2D spatial transformation parameters and multidimensional distortion parameters are concatenated by concatenation stage 113. A hybrid grid dataset and an associated hybrid space are therefore formed with each vector representing both sets of parameters. The distortion component of the hybrid space is referred to as control space. At step 420, divider 114 divides up the control space into control zones, each control zone determining a subset of control parameters. The division of the control space is based on the desired fitting accuracy and is limited by the availability of hardware resources. In addition, the geometry space (coordinate space) is also divided into geometry patches.

The control zones and geometry patches together divide the hybrid space into blocks. At step 430, the data in each block (geometry patch+control zone) is surface fit. The surface fitting process is adaptable to the degree of accuracy required. In one example of the invention, the surfaces are parameterized as polynomials and the degree of the polynomial determines the accuracy of the fit. At step 440, an error analysis of the surface fit is performed. The error of the fit is determined by comparing a set of points calculated from the fit against exact values obtained from the hybrid grid dataset obtained at step 410. If the difference between the two sets of values is more than a pre-determined tolerance level, the results of the error analysis are sent back to step 420 for a finer division of the hybrid space, resulting in a better resolution. Once the tolerance level is met, at step 450, the compacted surface coefficients are saved. At this point the function of compactor 110 is completed.

Once the compacted surface coefficients are determined, decompactor 150 functions dynamically. At step 460, dynamic control parameters are obtained. These parameters include multidimensional geometric and optical distortion parameters, as well as user parameters, in a user-friendly format. Any of these parameters may change dynamically. These parameters are then used to construct a hybrid space vector. At step 470, based on the constructed hybrid space vector, a warp map is decoded from the compacted surface coefficients. This decoded warp map represents a transformation that compensates for all geometric and optical distortion parameters. Once the warp map is determined, at step 480, it is relayed to apply to actual pixel coordinates to determine input pixel coordinates.

In another embodiment of the present invention, dynamic warp system 100 is used for color gamut transformation. In this example, the system handles transformation between two color spaces. The input and output color spaces could have different properties. This is very much pronounced in a printer application when an object on a display screen is to be printed on paper or other media. When printing an image from an RGB display onto paper, the printer has to transform the display color space onto the printer (e.g. CMY, color space). In addition, such spaces might be of different dimensions (e.g., RGB to CMYK or even to higher dimension color spaces with higher number of primaries). Moreover, the color spaces typically have different ranges. Unlike the RGB color space of a display screen, a printer color space is not an "additive space" but a "subtractive space". For instance, a ray of blue on a display screen creates the color blue. However a dot of blue on a white paper eliminates all other colors and only reflects blue, and hence the name subtractive. The color gamut transformation in this case is nonlinear, relating different ranges, and very complicated. Moreover, in a printer, there are varying factors like aging, paper type, user parameters, and drift.

In one example of the present invention, dynamic warp system 100 is adapted to input a set of control parameters corresponding to varying conditions and a set of spatial parameters, describing the mapping of RGB color coordinates to CMY or other color coordinates, which taken together form the hybrid grid dataset. There is color space grid data and distortion and control space grid data. These data are concatenated by concatenation stage 113 to produce a hybrid vector space. Divider 114 divides the hybrid vector space into hybrid blocks. Each block consists of a distortion parameter control zone and a color space geometry patch. In each hybrid block, the system fits a hypersurface, represented by a number of coefficients, to estimate the transformation grid data. These resulting coefficients are stored in an interface and are available for use by a decoder 153 in decompactor 150 to construct a warp map or more appropriately a "color mapping that transforms output color space onto the input color space).

Another example of color gamut transformation occurs in an adjustable display, like a TV monitor, with adjustable brightness, contrast, and tint which form a control space. For each particular setting of these parameters there is a color transformation map. Dynamic warp system 100, in this example, generates a hybrid space from the color space and control parameters and divides it into hybrid blocks as explained above. In each hybrid block, the system fits the grid transformation data with a hypersurface. Upon selection of a particular setting, the system decodes a warp map from a hypersurface, transforming a color space vector corresponding to the factory standard settings onto any specific setting determined by the user.

In both cases, the dynamic warp map generation allows for mapping to the limitation of the gamut range, and seamless and graceful mapping of the outer edges.

In another example of the color gamut transformation of the present invention, a color sensor is used to calibrate an aging printer or monitor. The calibration measurement results are fed back as control parameters. Controller 152 constructs a hybrid space vector out of these measurement results. Decoder 153 then dynamically generates a warp map for the appropriate color gamut transformation. The sensor calibration could also be used when printing on different types of paper as they yield different output colors. A new warp map is generated for a new type of paper, yielding an optimal and seamless gamut transformation. On certain types of paper one could never get great printing results, however, this method assures improved printing quality.

As will be apparent to those skilled in the art, various modifications and adaptations of the structure described above are possible without departing from the present invention, the scope of which is defined in the appended claims.

The invention claimed is:

1. An electronic system for dynamic m-dimensional digital data transformation, subject to varying N-dimensional distortion and control parameters, said system comprising:
   a. an input interface to obtain m-dimensional transformation data and N-dimensional distortion and control parameter sets,
   b. a concatenation stage coupled to said input interface, to concatenate m-dimensional transformation data and N-dimensional distortion and control parameter sets and to produce m+N dimensional hybrid grid data in a corresponding hybrid vector space,
   c. a divider coupled to said concatenation stage, to divide said hybrid vector space into a plurality of hybrid blocks, consisting of N-dimensional distortion control zones and m-dimensional geometry patches, based on a desired accuracy level,
   d. a surface function estimator, coupled to said divider, to parameterize said hybrid grid data, to generate a hypersurface map in each hybrid block, to estimate said hybrid grid data, wherein said hypersurfaces are represented by a plurality of compacted coefficients,
   e. a surface map interface, coupled to said surface function estimator, to store said compacted coefficients,
   f. a controller, to obtain instantaneous user and control parameters and to generate a vector in the hybrid vector space based on said user and control parameters,
   g. a decoder, coupled to said surface map interface and said controller, to dynamically compute instantaneous warp maps from said compacted coefficients corresponding to said vector in the hybrid vector space, and,
   h. an output interface to store and relay said instantaneous maps.

2. The system of claim 1, further including an error analysis stage coupled to said surface function estimator, said divider, and said concatenation stage, to check if the differences between a set of points computed from the hypersurface estimation and the same set of points extracted from the hybrid grid data are less than a preset tolerance level, and if not, to send the comparison results to said divider to further refine the hybrid vector space division.

3. An electronic system for dynamic two-dimensional digital image transformation described by two-dimensional spatial grid data and varying geometric and optical distortions described by multidimensional parameter data sets, said system comprising:
   a. an input interface to obtain two-dimensional spatial grid data and multidimensional distortion parameter data sets representing varying geometric and optical distortions,
   b. a concatenation stage, coupled to said input interface, to concatenate the multidimensional distortion parameter data sets and the two-dimensional spatial transformation grid data, and to produce hybrid grid data in a corresponding hybrid vector space,
   c. a divider, coupled to said concatenation stage, to divide said hybrid vector space into a plurality of hybrid blocks, consisting of multidimensional distortion control zones and two-dimensional spatial geometry patches, based on a desired accuracy level,
   d. a surface function estimator, coupled to said divider, to parameterize said hybrid grid data to generate a hypersurface map in each hybrid block, represented by a number of compacted coefficients,
   e. a warp interface, coupled to said surface functional estimator, to store said compacted coefficients representing the hypersurface maps,
   f. a controller to obtain instantaneous control parameters, including display parameters, distortion parameters, and user parameters, and to calculate hybrid space vectors from said control parameters,
   g. a decoder, coupled to said compacted warp interface and said controller, to dynamically compute instantaneous warp maps from said compacted coefficients corresponding to said hybrid space vectors, and,
   h. an output interface to store and relay said instantaneous warp maps.

4. The system of claim 3, further including an error analysis stage, coupled to said surface function estimator, said divider, and said concatenation stage, to check if the difference between a set of grid points computed from the hypersurface estimation and the same set of points extracted from the hybrid grid data, is less than a preset tolerance level, and if not, to send the comparison results to said divider to further refine the hybrid vector pace division.

5. The system of claim 3, further including a display converter to generate a map to fit a particular display surface from a standard normalized set by performing scaling operations.

6. The system of claim 3, wherein said surface function estimator is adapted to parameterize the hybrid grid data as surface polynomials.

7. The system of claim 6, wherein said surface functional estimator is adapted to vary said surface polynomials degree according to an accuracy level.

8. The system of claim 3, wherein said surface functional estimator is adapted to vary spatial transformation details according to a preset accuracy level.

9. The system of claim 3, wherein said divider is adapted to vary the number of control zones and geometry patches according to a preset accuracy level.

10. The system of claim 1 used for color gamut transformation, wherein the system is adapted to generate hybrid space blocks by dividing the color space into geometry patches, and dividing associated distortion and control parameter space into control zones, and to fit exact grid data with hypersurfaces in each hybrid space block.

11. The system of claim 10 used in a printer application, wherein the hypersurfaces map a display color space onto a printer color space, said printer having varying distortion and control parameters including drift, aging, paper type, and user selected shades.

12. The system of claim 11, further including a color sensor to perform color calibration, and wherein the calibration results are used as control parameters and are converted into a hybrid space vector, to generate a new warp map for color transformation.

13. The system of claim 10 used in a display device, wherein the hypersurfaces map a standard RGB space onto a user selected color space characterized with desired user parameters including brightness, contrast, and tint.

14. The system of claim 13, further including a color sensor to perform color calibration, and wherein the calibration results are used as control parameters and are converted into a hybrid space vector, to generate a new warp map for color transformation.

15. An electronic method for dynamic m-dimensional digital data transformation, subject to varying N-dimensional distortion and control parameters, said method comprising:
  a. obtaining m-dimensional transformation data and N-dimensional distortion and control parameter sets,
  b. concatenating the m-dimensional transformation data and N-dimensional distortion and control parameter sets and producing m+N dimensional hybrid grid data in a corresponding hybrid vector space,
  c. dividing said hybrid vector space into a plurality of hybrid blocks, consisting of N-dimensional distortion control zones and m-dimensional geometry patches, based on a desired accuracy level,
  d. parameterizing said hybrid grid data to generate a hypersurface map in each hybrid block to estimate said hybrid grid data, wherein said hypersurfaces are represented by a plurality of compacted coefficients,
  e. storing said compacted coefficients,
  f. obtaining instantaneous user and control parameters and generating a vector in the hybrid vector space based on said user and control parameters,
  g. dynamically computing instantaneous warp maps from said compacted coefficients corresponding to said vectors in the hybrid vector space obtained in "f", and,
  h. storing and relaying said instantaneous warp maps.

16. The method of claim 15, further performing an error analysis to check if the differences between a set of points computed from the hypersurface estimation and the same set of points extracted from the hybrid grid data is less than a preset tolerance level, and if not, further refining the hybrid vector space division.

17. An electronic method for dynamic two-dimensional digital image transformation described by two-dimensional spatial grid data and varying geometric and optical distortions described by multidimensional parameter data sets, said method comprising:
  a. obtaining the two-dimensional spatial grid data and multidimensional distortion parameter data sets representing varying geometric and optical distortions,
  b. concatenating the multidimensional distortion parameter data sets and the two-dimensional spatial grid data, to produce hybrid grid data in a corresponding hybrid vector space,
  c. dividing said hybrid vector space into a plurality of hybrid blocks, consisting of multidimensional distortion control zones and two-dimensional spatial geometry patches, based on a desired accuracy level and,
  d. parameterizing said hybrid grid data to generate a hypersurface in each hybrid block, wherein the hypersurface estimates the hybrid grid data, and wherein the hypersurface is represented by a number of compacted coefficients,
  e. storing said compacted coefficients representing the hypersurface maps,
  f. obtaining instantaneous control parameters, including display parameters, distortion parameters, and user parameters, and calculating hybrid space vectors based on said control parameters,
  g. dynamically computing instantaneous warp maps from said compacted coefficients corresponding to said hybrid space vectors obtained in "f", and,
  h. storing and relaying said instantaneous warp maps.

18. The method of claim 17, further performing an error analysis to check if the difference between a set of grid points computed from the hypersurface estimation and same set of points extracted from hybrid grid data, is less than a preset tolerance level, and if not, further refining the hybrid vector space division.

19. The method of claim 17, further generating a map to fit a particular display surface from a standard normalized set by performing scaling operations.

20. The method of claim 17, wherein the fitted hypersurfaces are surface polynomials.

21. The method of claim 20, further varying said surface polynomial degrees according to a preset accuracy level.

22. The method of claim 17, further varying spatial transformation details according to a preset accuracy level.

23. The method of claim 17, further varying the number of control zones and geometry patches according to a preset accuracy level.

24. The method of claim 15 used as a color gamut transformation, wherein the method generates hybrid space blocks by dividing the color space into geometry patches, and dividing associated distortion and control parameter space into control zones, and fits grid data with hypersurfaces in each hybrid space block.

25. The method of claim 24 used in a printer application, wherein the hypersurfaces map a display color space onto a printer color space, said printer having varying distortion and control parameters including drift, aging, paper type, and user selected shades.

26. The method of claim 25, further including color sensing to perform color calibration, and wherein the calibration results are used as control parameters and are converted to a hybrid space vector, to generate a new warp map for color transformation.

27. The method of claim 24 used in a display device, wherein the hypersurfaces map a standard RGB space onto a user selected color space characterized with desired user parameters including brightness, contrast, and tint.

28. The method of claim 27, further including color sensing to perform color calibration, and wherein the calibration results are used as control parameters and are converted to a hybrid space vector, to generate a new warp map for color transformation.

* * * * *